United States Patent [19]

Tani et al.

[11] 4,106,763
[45] Aug. 15, 1978

[54] CASSETTE TYPE SHEET FEED APPARATUS FOR COPYING MACHINE OR THE LIKE

[75] Inventors: Tatsuo Tani; Toshiaki Kameyama, both of Tokyo, Japan

[73] Assignee: Ricoh Company, Ltd., Tokyo, Japan

[21] Appl. No.: 740,284

[22] Filed: Nov. 9, 1976

[30] Foreign Application Priority Data

Nov. 11, 1975 [JP] Japan .................. 50-135298

[51] Int. Cl.² .............. B65H 1/12; B65H 1/23; B65H 3/44
[52] U.S. Cl. ........................... 271/9; 271/127; 271/160; 271/171
[58] Field of Search ........... 271/9, 127, 160, 164, 271/162, 171

[56] References Cited
U.S. PATENT DOCUMENTS

| | | | |
|---|---|---|---|
| 3,689,064 | 9/1972 | Kuksa | 271/127 X |
| 3,977,666 | 8/1976 | Suzuki et al. | 271/9 |
| 4,032,136 | 6/1977 | Komaba et al. | 271/127 X |

Primary Examiner—Bruce H. Stoner, Jr.
Attorney, Agent, or Firm—Frank J. Jordan

[57] ABSTRACT

Cassettes containing different sizes of sheets are selectively insertable below a feed roller. Each cassette has a bottom wall formed with a hole and a plate having a front edge aligned with the front of the cassette and a rear edge tiltably connected to the bottom wall. An actuator is insertable through the hole to tilt the plate and sheets upwardly so that the top sheet engages with the feed roller. Each cassette is designed to contain stacks of sheets of a predetermined width and various lengths. For sheets of less than maximum length a rear edge guide is mounted on the plate or bottom wall to align the front edges of the sheets with the front edge of the plate. The length of each plate is no greater than the length of the shortest sheet of the respective width. The length of the plates are predetermined in such a manner that the weight of the sheets of any size transmitted to the actuator through the respective plate is equal and the pressure between the sheets and the roller is the same regardless of the sheet size.

14 Claims, 11 Drawing Figures

Fig. 5a  Fig. 5b  Fig. 5c
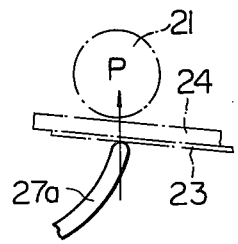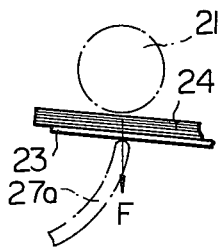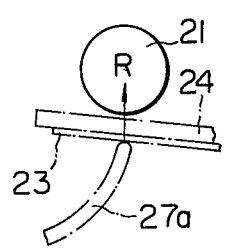
Fig. 6
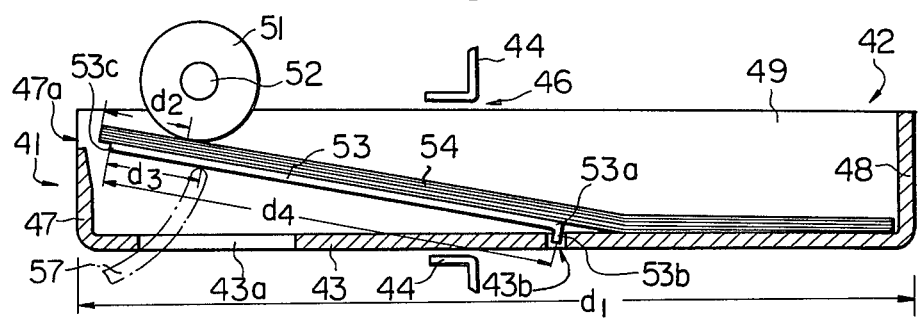
Fig. 7
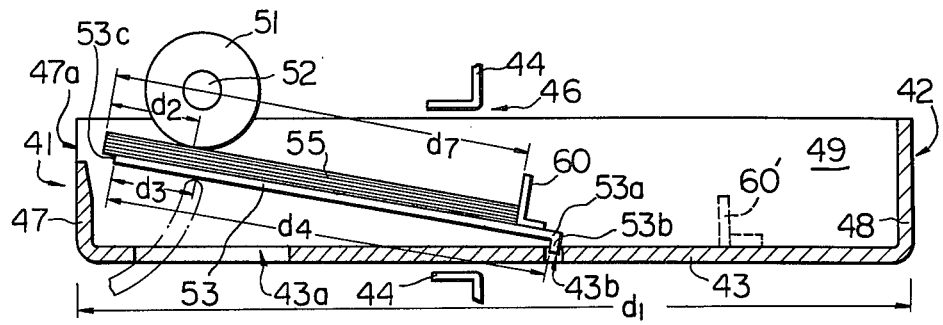

4,106,763

1

CASSETTE TYPE SHEET FEED APPARATUS FOR COPYING MACHINE OR THE LIKE

BACKGROUND OF THE INVENTION

The present invention relates to a cassette type sheet feed apparatus for a copying machine or the like.

Cassette type sheet feed systems are known in the art which comprise a plurality of cassettes containing different sizes of sheets. Each cassette has a bottom wall formed with a hole and a plate having a front edge aligned with the front of the cassette and a rear edge aligned with the rear of the cassette and tiltably connected to the bottom wall. An actuator is insertable through the hole to tilt the plate and sheets upwardly so that the top sheet engages with the feed roller. Each cassette is designed to contain stacks of sheets of a predetermined width and various lengths. The width of each plate is equal to the width of the corresponding sheets and the length of the plate is equal to the length of the longest sheet of the corresponding width. For sheets of less than maximum length, a rear edge guide is mounted on the plate at an intermediate position to align the front edges of the sheets with the front edge of the plate. The force pressing the sheets against the feed roller is equal to the difference between the upward force applied to the actuator for tilting the plate and the downward force transmitted to the actuator by the plate corresponding to the distributed weight of the sheets on the plate and the resulting moment about the rear edge of the plate. It is clear that wider and longer sheets are heavier and will exert a greater weight on the actuator. In a practical sheet feed apparatus, the upward force is applied to the actuator by a spring and is therefore constant. Therefore, the force pressing the sheets and roller together will be greatest for the narrowest and shortest sheets and smallest for the widest and longest sheets. This condition is extremely disadvantageous from the viewpoint of reliability of sheet feed, and if the range of sizes of the sheets is great enough the smallest sheets will be creased or torn and the largest sheets will not be fed resulting in sheet jams.

Various expedients have been proposed in the prior art to overcome this problem, one being to provide a plurality of actuator biasing springs and a mechanical switching device to provide the proper spring or combination of springs to bias the actuator in accordance with the size of the sheets in the cassette. Another expedient is to provide a single spring and means for varying the preload thereof in accordance with the size of the sheets. Both of these arrangements suffer from the drawbacks of complication and high cost to manufacture. To overcome these drawbacks, compromises are often implemented which result in less than satisfactorily reliable sheet feed.

SUMMARY OF THE INVENTION

It is an object of the present invention to provide a cassette type sheet feed apparatus for a copying machine or the like which provides reliable sheet feed regardless of the sizes of sheets contained in the cassettes.

It is another object of the present invention to provide a sheet feed apparatus comprising cassettes designed in such a manner that the force exerted on an actuator by the weight of the sheets is the same for all sizes of sheets.

2

It is another object of the present invention to provide a sheet feed apparatus comprising sheet cassettes which are selectively insertable below a feed roller, each cassette having a bottom wall formed with a hole and a plate having a front edge aligned with the front of the cassette and a rear edge tiltably connected to the bottom wall. An actuator is insertable through the hole to tilt the plate and sheets upwardly so that the top sheet engages with the feed roller. Each cassette is designed to contain stacks of sheets of a predetermined width and various lengths. For sheets of less than maximum length, a rear edge guide is mounted on the bottom wall to align the front edges of the sheets with the front edge of the plate. The length of each plate is no greater than the length of the shortest sheet of the respective width. The lengths of the plates are predetermined in such a manner that the weight of the sheets of any size transmitted to the actuator through the respective plate is equal and the pressure between the sheets and the roller is the same regardless of the sheet size.

It is another object of the present invention to provide a generally improved sheet feed apparatus for a copying machine or the like.

Other objects, together with the foregoing, are attained in the embodiment described in the following description and illustrated in the accompanying drawings.

BRIEF DESCRIPTION OF THE DRAWING

FIGS. 5a to 5c are diagrams illustrating the forces involved in the sheet feed apparatus;

FIG. 6 is a longitudinal sectional view of a sheet feed apparatus of the present invention in an operative status for feeding sheets of a maximum length;

FIG. 7 is similar to FIG. 6 but shows the apparatus feeding sheets of half size;

DESCRIPTION OF THE PREFERRED EMBODIMENT

While the sheet feed apparatus of the invention is susceptible of numerous physical embodiments, depending upon the environment and requirements of use, substantial numbers of the herein shown and described embodiment have been made, tested and used, and all have performed in an eminently satisfactory manner.

Figure 1:
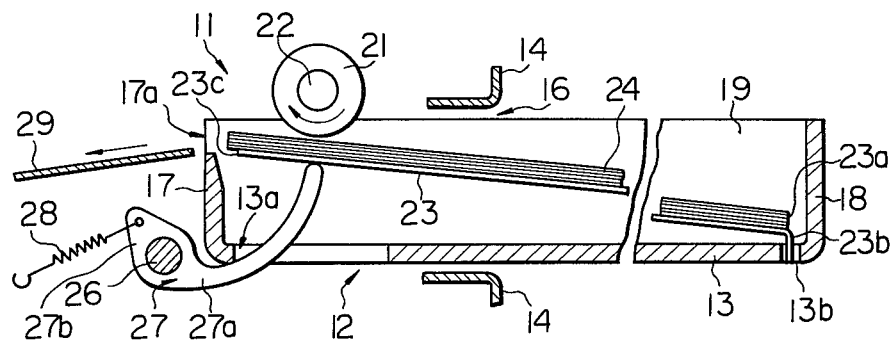
FIG. 1 is a longitudinal sectional view of a prior art sheet feed apparatus in an operative status.
Figure 2:
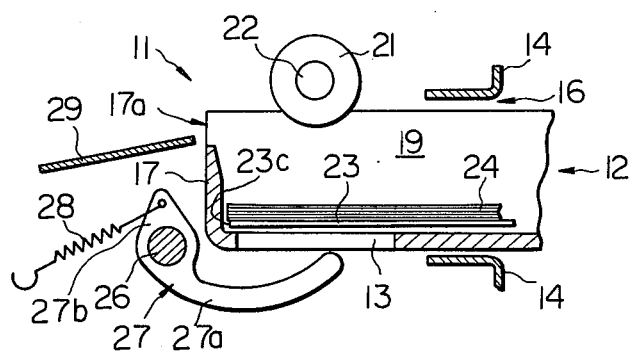
FIG. 2 is similar to FIG. 1 but shows in fragmentary form the prior art sheet feed apparatus in an inoperative status.

Referring now to FIGS. 1 and 2 of the drawing, a prior art sheet feed apparatus 11 for a copying machine or the like comprises a plurality of cassettes for containing sheets of different respective sizes. To illustrate the principles and drawbacks of the prior art, a cassette 12 is shown which comprises a bottom wall 13 formed with a hole 13a therethrough. The cassettes are selectively insertable into a frame 14 through an opening 16 for support thereby. The cassette 12 is further formed with upstanding front and rear walls 17 and 18 respectively, with the upper portion of the front wall 17 being cut away at 17a. Side walls 19 span the front and rear walls 17 and 18 with only one side wall 19 being visible in the drawing.

A feed roller 21 is mounted on a shaft 22 above the cassette 12 through a one-way clutch (not shown) for unitary rotation in the clockwise direction. A sheet support plate 23 is tiltably connected at a rear edge 23a thereof by means of downwardly extending lugs 23b which engage in conjugate holes 13b, formed in the bottom wall 13.

A front edge 23c of the plate 23 aligns with the front wall 17 and the rear edge 23a aligns with the rear wall 18 of the cassette 12. The side edges (not designated) of the plate 23 are aligned with the side edges 19 of the cassette 12 so that the plate 23 is substantially coextensive with the rectangular inner area of the cassette 12.

The cassette 12 is designed to contain a stack of sheets 24 having the same width as the plate 23. As shown in FIGS. 1 and 2, the sheets 24 also have the same length as the plate 23 which is the maximum length in which the sheets 24 of the corresponding width are supplied.

A shaft 26 rotatably supports an actuator 27 which is formed with an actuator arm 27a and a spring arm 27b. A tension spring 28 biases the actuator 27 counterclockwise so that the actuator arm 27a thereof intrudes into the cassette 12 through the hole 13a and tilts the plate 23 and sheets 24 clockwise about the rear edge 23a so that the top sheet 24 is pressed into engagement with the feed roller 21. Clockwise rotation of the feed roller 21 feeds the top sheet 24 leftwardly out of the cassette 12 through the cut away 17a of the front wall 17 over a guide 29 to a transfer station of a copying machine or the like (not shown). FIG. 1 shows the apparatus 11 in an operative sheet feed status and FIG. 2 shows the apparatus 11 in an inoperative status. More specifically, in FIG. 2a means which is not shown applies a force to rotate the actuator 27 clockwise against the force of the spring 28 so that the arm 27a thereof is retracted from the cassette 12. This allows the plate 23 to tilt downwardly and rest on the bottom wall 13 so that the cassette 12 may be inserted into or removed from the frame 14.

Figure 3:
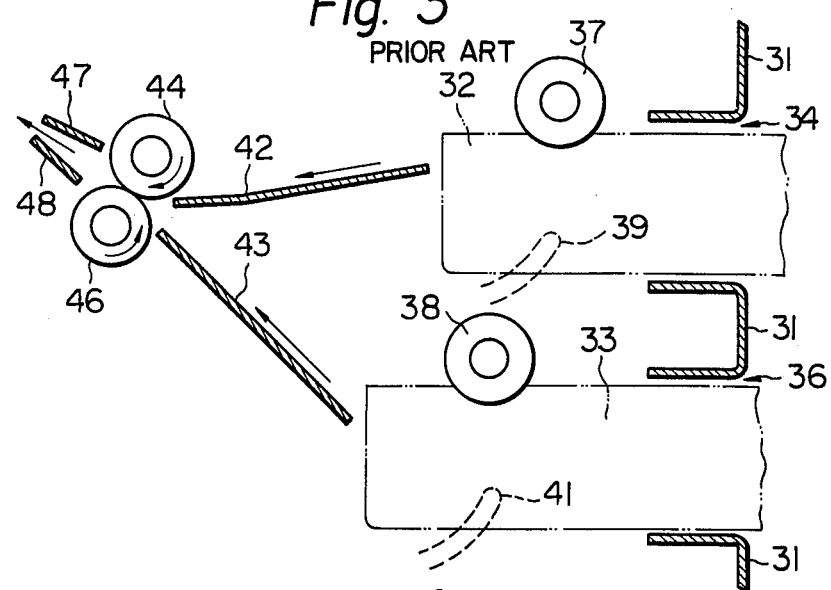
FIG. 3 is a schematic view showing a vertical stacking arrangement of sheet cassettes which is applicable both to the prior art and the present invention.

Both the prior art apparatus 11 and the apparatus embodying the present invention which will be described in detail below may be provided in two arrangements. In one arrangement only one space is provided in the frame and cassettes of various sizes may be selectively inserted into the space. In another arrangement which is illustrated in FIG. 3, a frame 31 is constructed so that two cassettes 32 and 33 containing different sizes of sheets may be inserted into the frame 31 through openings 34 and 36 respectively. Feed rollers 37 and 38 are provided above the cassettes 32 and 33 and actuators 39 and 41 are provided below the cassettes 32 and 33 respectively.

In the arrangement of FIG. 3 the feed rollers 37 and 38 and actuators 39 and 41 are selectively controlled to feed sheets from the selected cassette 32 or 33 over guides 42 and 43 respectively to feed rollers 44 and 46 which feed the sheets through guides 47 and 48 to the copying machine or the like. Although two cassettes 32 and 33 are illustrated, three or more cassettes may be provided in the vertically stacked arrangement.

Figure 4:
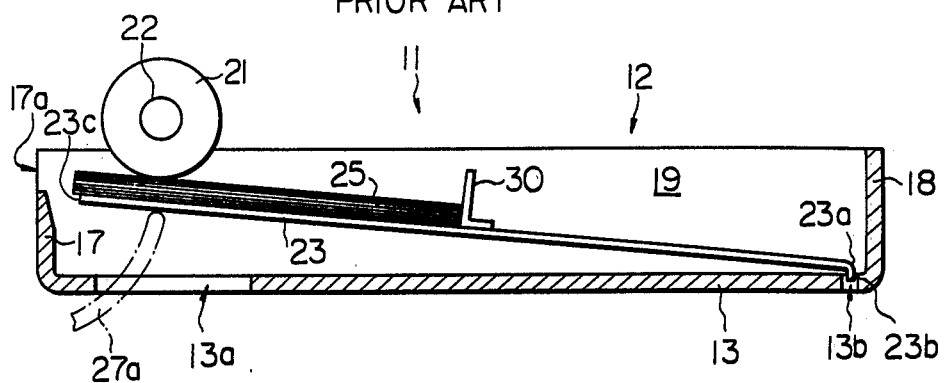
FIG. 4 is a longitudinal sectional view showing the prior art apparatus adapted to feed sheets of half size.

FIG. 4 shows how the prior art cassette 12 is adapted to contain sheets 25 which have the same width as the sheets 24 but a shorter length, for example, half the length. A rear edge guide 30 is mounted on the plate 23 to maintain the front edges of the sheets 25 substantially in alignment with the front edge 23c of the plate 23.

However, a problem is inherent in the prior art apparatus 11 which is illustrated in FIGS. 5a to 5c. In FIG. 5a, the actuator arm 27a and feed roller 21 are shown as engaging with the opposite sides of the plate 23 and sheets 24 in a diametrically opposed manner, with the upward force applied to the plate 23 by the actuator 27 being designated as P. Since only one spring 28 is provided, the force P is constant and is independent of the size of the sheets in the cassette. FIG. 5b illustrates the downward force applied to the actuator 27, which is designated as F, resulting from the weight of the plate 23 and sheets 24. The force F is equal to the moment of the plate 23 about the rear edge 23a thereof, resulting from the distributed load of the plate 23 and sheets 24 divided by the distance between the point of contact of the arm 27a and the rear edge 23a of the plate 23. FIG. 5c illustrates the resulting upward force R applied to press the sheets 24 against the feed roller 21, and is the difference between the forces P and F.

It is clear from an examination of the apparatus 11 that although the force P is constant, the force P will vary with the size of the sheets. More specifically, the wider and longer the sheets the greater the distributed load thereof on the plate 23 and the greater the force F. This means that the force R will decrease with the size of the sheets and that larger sheets will be pressed against the feed roller 21 with less force than smaller sheets. This may result in small sheets being creased or torn and large sheets not being fed, both extreme conditions causing sheet jams and necessitating cessation of operation and maintainance of the apparatus 11.

This problem is overcome by an apparatus 41 embodying the present invention which is illustrated in FIGS. 6 to 10. The apparatus 41 comprises a cassette 42 which has a bottom wall 43 formed with a hole 43a. The cassette 42 is selectively insertable into a frame 44 through an opening 46 for support thereby. The cassette 42 is further formed with upstanding front and rear walls 47 and 48 respectively, with the upper portion of the front wall 47 being cut away at 47a. Side walls 49 span the front and rear walls 47 and 48 with only one side wall 49 being visible in the drawing.

A feed roller 51 is mounted on a shaft 52 above the cassette 42 through a one-way clutch (not shown) for unitary rotation in the clockwise direction. A sheet support plate 53 is tiltably connected at a rear edge 53a thereof by means of downwardly extending lugs 53b which engage in conjugate holes 43b formed in the bottom wall 43.

Although the width of the plate 53 is substantially equal to the distance between the side walls 49 and the front edge 53c of the plate 53 substantially aligns with the front wall 47 of the cassette 42, the rear edge 53a is not aligned with the rear wall 48 as in the prior art apparatus 11 but is spaced between the front and rear walls 47 and 48 respectively.

Also shown is an actuator 57 to intrude through the hole 43a to tilt the plate 53 and press the sheets 54 into engagement with the feed roller 51 as described with reference to the prior art apparatus 11.

Where sheets 54 having the same width and length as the rectangular area of the cassette 42 are contained in the cassette 42, the plate 53 only supports the portion of the sheets 54 which are disposed above the plate 53, with the remaining portion of the sheets 54 being supported by the bottom wall 43. As viewed in FIG. 6, the portion of the sheets 54 to the left of the rear edge 53a of the plate 53 is supported by the plate 53 and the portion of the sheets 54 to the right of the rear edge 53a are supported by the bottom wall 43.

In FIG. 6 the distance between the front and rear walls 47 and 48 and thereby the length of the longest sheets of a width $w_1$ are designed as $d_1$. The distance between the front wall 47 and the axis of the feed roller 51 is designated as $d_2$. The distance between the point of engagement of the actuator 57 and the bottom of the plate 53 is designated as $d_3$, and is preferably equal to $d_2$ so that the actuator 57 and feed roller 51 apply the forces P and R respectively to the plate 53 and sheets 54 in a diametrically opposed manner. The length of the plate 53 between the front and rear edges 53c and 53a respectively is designated as $d_4$. The front edges of the sheets 54 are substantially aligned with the front edge of the plate 53.

Since only the portion of the sheets 54 actually disposed above the plate 53 will apply a downward force to the plate 53 due to the weight of the sheets 54, it is clear that as long as the sheets 54 are aligned with the front edge 53c of the plate 53 and are at least as long as the plate 53, the distributed weight on the plate 53 will be same regardless of whether the sheets have a length of $d_4$ or $d_1$ or any length intermediate therebetween. In this manner, the downward force F exerted by the plate 53 on the actuator 57 is the same regardless of the length of the sheets 54 and the pressure between the sheets 54 and the feed roller 51 is also the same, thereby overcoming the problem of the prior art.

Whereas FIG. 6 illustrates how the sheets 54 of maximum length $d_1$ are contained in the cassette 42, FIG. 7 shows sheets 55 of minimum length $d_7$, in this example one half the length $d_1$, operatively contained in the cassette 42. A rear edge guide 60 is mounted on the plate 53 at the distance $d_7$ from the front edge 53c which provides a stop for the rear edges of the sheets 55 and which maintains the front edges of the sheets 55 in substantial alignment with the front edge 23c when the plate 53 is tilted for sheet feed. Although it is desirable to make the length $d_4$ of the plate 53 at least equal to the length $d_7$ of the sheets 55, a small space, shown in exaggerated scale in FIG. 7, may be required for mounting the rear edge guide 60. The slight difference in distributed loading resulting from not having the sheets 55 extend over the entire length of the plate 53 is not significant in practical application and may be overcome by providing the rear edge guide 60 of a weight sufficient to balance out the difference.

As indicated in phantom line in FIG. 7, a rear edge guide 60' may be mounted on the bottom wall 43 between the plate 53 and rear wall 48 to accommodate sheets having a length intermediate between the sheets 54 and 55.

Figure 8:
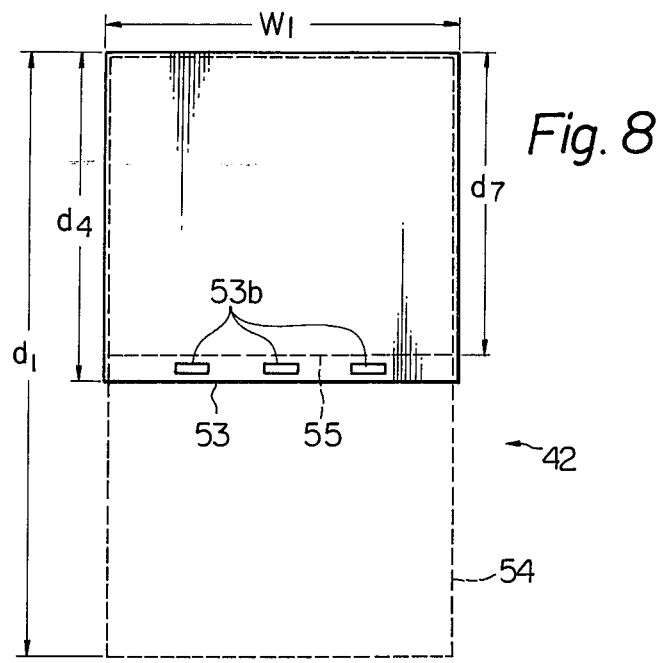
FIG. 8 is a diagram showing the dimensions of a cassette and sheets of large width.
Figure 9:
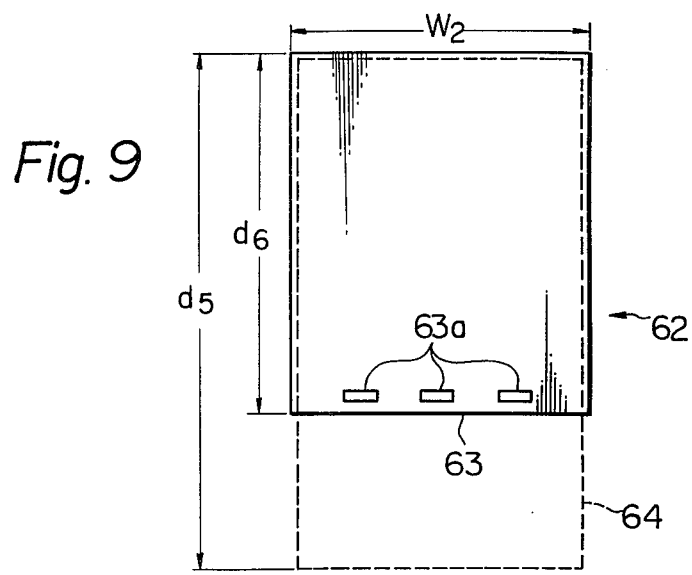
FIG. 9 is similar to FIG. 8 but illustrates a cassette and sheets of small width.

Whereas the description thus far has disclosed how sheets of width $w_1$ and any length between $d_4$ and $d_1$ may be contained in the cassette 42 and exert the same force on the actuator 57, FIGS. 8 and 9 illustrate how a cassette 62 for sheets of a smaller width $w_2$ and lengths between $d_6$ and $d_5$ may be used with the same actuator 57 and exert the same force thereon regardless of the size of the sheets. The cassette 62 has the same overall construction as the cassette 42 and only a plate 63 formed with lugs 63a and sheets 64 supported thereon are shown in FIG. 9. The cassette 42 is similarly shown in FIG. 8.

For the purpose of enabling a useful computation, it will be assumed that all sheets used in the apparatus 41 have the same specific weight and are stacked to the same height in the respective cassettes. It will be furthermore assumed that the analysis is performed when the actuator 57 just engages the plate 53 or 63 with the plate 53 or 63 supported at two points; the rear edge thereof and the actuator 57.

Taking first the plate 53, the weight $M_1$ of the sheets 54 thereon is equal to the product of the specific weight and height of the stack of sheets 54, which is designated here as a constant K, the width of the plate 53 and the length of the plate 53 as follows:

$$M_1 = Kw_1d_4 \tag{1}$$

and has a resultant at the center of the plate 53 which is axially spaced from the rear edge of the plate 53 by half the length of the plate 53 or ($d_4/2$). The force F, here designated as $F_1$ is applied to the actuator 57 at a distance ($d_4-d_3$) from the rear edge of the plate 53. Taking moments about the rear edge of the plate 53 produces $$M_1(d_4/2) = F_1(d_4-d_3) \tag{2}$$

which reduces to $$F_1 = M_1d_4/2(d_4-d_3) \tag{3}$$

Combining equations (1) and (3) produces $$F_1 = Kw_1(d_4)^2/2(d_4-d_3) \tag{4}$$

A similar analysis for the plate 63 produces $$F_2 = Kw_2(d_6)^2/2(d_6-d_3) \tag{5}$$

where $F_2$ is the force exerted by the plate 63 on the actuator 57. Since it is desired to equalize the force on the actuator 57, $F_1 = F_2$ and equations (4) and (5) are combined to produce $$w_1(d_4)^2/(d_4-d_3) = w_2(d_6)^2/(d_6-d_3) \tag{6}$$

Therefore, when the desired force on the actuator 57, which is equal to $F_1$ or $F_2$ is selected, the dimensions of the plates 53 and 63 may be calculated by means of equations (4) and (5). In addition, if the dimensions of either plate 53 or 63 are selected, the dimensions of the other plate 53 or 63 may be calculated by means of equation (6).

FIGS. 8 and 9 show, to scale, the plate 53 dimensioned for JIS(Japanese Industrial Standard) B format and the plate 63 dimensioned for JIS A format. The sheets 54 are JIS B4 having a width of 257mm and a length of 364mm. The sheets 55 are JIS B5 having a width of 257mm and a length of 182mm, or half of B4. The length of the plate 53 is 187mm, only 5mm longer than the sheets 55. As mentioned above, such a small difference is insignificant in practical application and allows mounting of the rear edge guide 60.

Based on the dimensions of the plate 53, the dimensions of the plate 63 are calculated using equation (6). With the cassette 62 designed for JIS A4 sheets 64, having a width of 210mm and a length of 297mm, the required length of the plate 63 is 240mm.

As is understood from even a cursory examination of FIGS. 8 and 9, whereas the B format sheets 54 and 55 are wider than the A format sheets 64, the plate 53 is made shorter than the plate 63 thereby equalizing the load on the actuator 57 and attaining the objects of the invention.

Many modifications will become possible for those skilled in the art after receiving the teachings of the present disclosure without departing from the scope of the invention.

What is claimed is:

1. A cassette type sheet feed apparatus comprising:

a first sheet cassette including a bottom wall formed with a hole therethrough, a front wall and a rear wall spaced from the front wall of the first cassette by a first predetermined distance;

a first feed roller rotatably supportable above the cassette and spaced from the front wall of the first cassette by a second predetermined distance which is shorter than the first predetermined distance;

a first actuator intrudable into the first cassette through the hole thereof at a third predetermined distance from the front wall of the first cassette which is shorter than the first predetermined distance;

a first sheet supporting plate supported on the bottom wall of the first cassette, the first plate having a front edge substantially in alignment with the front wall of the first cassette and a rear edge spaced from the front edge of the first place by a fourth predetermined distance which is longer than the third predetermined distance and shorter than the first predetermined distance, the rear edge of the first plate being tiltably connected to the bottom wall of the first cassette, the first plate having a first predetermined width and being adapted to support a stack of identical first sheets of substantially the first predetermined width and a length which is substantially at least equal to the fourth predetermined distance and less than the first predetermined distance, the first actuator being engageable with the first plate to tilt the first plate toward the first feed roller so that the first sheets feedably engage with the first feed roller, the fourth predetermined distance being selected so that, with the first plate supporting the first sheets, a force exerted on the first actuator by the first plate as the first actuator engages the first plate is equal to a predetermined value;

a second sheet cassette including a bottom wall formed with a hole therethrough, a front wall and a rear wall spaced from the front wall of the second cassette by a fifth predetermined distance;

a second feed roller rotatably supportable above the second cassette and spaced from the front wall of the second cassette by the second predetermined distance;

a second actuator intrudable into the second cassette through the hole thereof at the third predetermined distance from the front wall of the second cassette; and a second sheet supporting plate supported on the bottom wall of the second cassette, the second plate having a front edge substantially in alignment with the front wall of the second cassette and a rear edge spaced from the front edge of the second plate by a sixth predetermined distance which is longer than the third predetermined distance and shorter than the fifth predetermined distance, the rear edge of the second plate being tiltably connected to the bottom wall of the second cassette, the second plate having a second predetermined width different from the first predetermined width and being adapted to support a stack of identical second sheets of substantially the second predetermined width and a length which is substantially at least equal to the sixth predetermined distance and less than the fifth predetermined distance, the second actuator being engageable with the second plate to tilt the second plate toward the second feed roller so that the second sheets feedably engage with the second feed roller, the relative magnitude of the sixth and fourth predetermined distances being dependent on the relative magnitude of the second and first predetermined widths so that, with the second plate supporting the second sheets, a force exerted on the second actuator by the second plate as the second actuator engages the second plate is equal to said predetermined value.

2. A sheet feed apparatus as in claim 1, in which the relative magnitude of the sixth and fourth predetermined distances is determined in substantial accordance with the following relation:

$$w_1(d_4)^2/(d_4-d_3) = w_2(d_6)^2/(d_6-d_3)$$

where
$w_1$ is the first predetermined width;
$w_2$ is the second predetermined width;
$d_3$ is the third predetermined distance;
$d_4$ is the fourth predetermined distance; and
$d_6$ is the sixth predetermined distance.

3. A sheet feed apparatus as in claim 1, in which the second and third predetermined distances are substantially equal.

4. A sheet feed apparatus as in claim 1, in which the first cassette further comprises a rear edge guide to maintain front edges of the first sheets in substantial alignment with the front edge of the first plate.

5. A sheet feed apparatus as in claim 4, in which the rear edge guide is detachably mountable on the bottom wall of the first cassette between the first plate and the rear wall thereof.

6. A sheet feed apparatus as in claim 4, in which the rear edge guide is attached to the rear edge of the first plate.

7. An apparatus as in claim 1, in which the bottom wall of the first cassette is formed with a plate hole, the rear edge of the first plate being formed with a lug which extends into the plate hole to tiltably connect the first plate to the bottom wall of the first cassette.

8. A sheet feed apparatus as in claim 1, wherein the sixth predetermined distance is greater than the fourth predetermined distance when the first predetermined width is greater than the second predetermined width.

9. A sheet feed apparatus as in claim 1, wherein the sixth predetermined distance is less than the fourth predetermined distance when the first predetermined width is less than the second predetermined distance.

10. A sheet feed apparatus as in claim 9, wherein the sixth predetermined distance is greater than the fourth predetermined distance when the first predetermined width is greater than the second predetermined width.

11. A cassette type sheet feed apparatus comprising:

a first sheet cassette including a bottom wall formed with a hole therethrough, a front wall and a rear wall spaced from the front wall of the first cassette by a first predetermined distance;

a feed roller rotatably supportable above the cassette and spaced from the front wall of the first cassette by a second predetermined distance which is shorter than the first predetermined distance;

an actuator intrudable into the first cassette through the hole thereof at a third predetermined distance from the front wall of the first cassette which is shorter than the first predetermined distance;

a first sheet supporting plate supported on the bottom wall of the first cassette, the first plate having a front edge substantially in alignment with the front wall of the first cassette and a rear edge spaced from the front edge of the first plate by a fourth predetermined distance which is longer than the third predetermined distance and shorter than the first predetermined distance, the rear edge of the first plate being tiltably connected to the bottom wall of the first cassette, the first plate having a first predetermined width and being adapted to support a stack of identical first sheets of substantially the first predetermined width and a length which is substantially at least equal to the fourth predetermined distance and less than the first predetermined distance, the actuator being engageable with the first plate to tilt the first plate toward the feed roller so that the first sheets feedably engage with the feed roller, the fourth predetermined distance being selected so that, with the first plate supporting the first sheets, a force exerted on the actuator by the first plate as the actuator engages the first plate is equal to a predetermined value;

a second sheet cassette including a bottom wall formed with a hole therethrough, a front wall and a rear wall spaced from the front wall of the second cassette by a fifth predetermined distance;

the first cassette being replaceable by the second cassette so that the feed roller is rotatably supportable above the second cassette and spaced from the front wall of the second cassette by the second predetermined distance and the actuator is intrudable into the second cassette through the hole thereof at the third predetermined distance from the front wall of the second cassette; and a second sheet supporting plate supported on the bottom wall of the second cassette, the second plate having a front edge substantially in alignment with the front wall of the second cassette and a rear edge spaced from the front edge of the second plate by a sixth predetermined distance which is longer than the third predetermined distance and shorter than the fifth predetermined distance, the rear edge of the second plate being tiltably connected to the bottom wall of the second cassette, the second plate having a second predetermined width different from the first predetermined width and being adapted to support a stack of identical second sheets of substantially the second predetermined width and a length which is substantially at least equal to the sixth predetermined distance and less than the fifth predetermined distance, the actuator being engageable with the second plate to tilt the second plate toward the feed roller so that the second sheets feedably engage with the feed roller, the relative magnitude of the sixth and fourth predetermined distances being dependent on the relative magnitude of the second and first predetermined widths so that, with the second plate supporting the second sheets, a force exerted on the actuator by the second plate as the actuator engages the second plate is equal to said predetermined value.

12. A sheet feed apparatus as in claim 11, in which the relative magnitude of the sixth and fourth predetermined distances is determined in substantial accordance with the following relation:

$$w_1(d_4)^2/d_4 - d_3 = w_2(d_6)^2/d_6 - d_3$$

where $w_1$ is the first predetermined width;
$w_2$ is the second predetermined width;
$d_3$ is the third predetermined distance;
$d_4$ is the fourth predetermined distance; and
$d_6$ is the sixth predetermined distance.

13. A sheet feed apparatus as in claim 11, in which the second and third predetermined distances are substantially equal.

14. A sheet feed apparatus as in claim 11, wherein the sixth predetermined distance is greater than the fourth predetermined distance when the first predetermined width is greater than the second predetermined width.

* * * * *